(12) United States Patent
Kotani et al.

(10) Patent No.: US 7,771,854 B2
(45) Date of Patent: Aug. 10, 2010

(54) FUEL CELL SYSTEM AND METHOD OF DETECTING FAILURE IN A FUEL GAS CHANNEL OF FUEL CELL SYSTEM

(75) Inventors: Yasunori Kotani, Utsunomiya (JP); Shinji Yoshikawa, Utsunomiya (JP); Akio Yamamoto, Utsunomiya (JP); Tomoki Kobayashi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 1303 days.

(21) Appl. No.: 11/280,618

(22) Filed: Nov. 15, 2005

(65) Prior Publication Data

US 2006/0115700 A1 Jun. 1, 2006

(30) Foreign Application Priority Data

Nov. 30, 2004 (JP) .............................. 2004-346260

(51) Int. Cl.
*H01M 8/04* (2006.01)

(52) U.S. Cl. ............................... 429/13; 429/25; 429/38

(58) Field of Classification Search ....................... None
See application file for complete search history.

(56) References Cited

FOREIGN PATENT DOCUMENTS

| JP | 2003-331893 | 11/2003 |
| JP | 2004-192919 | 7/2004 |
| WO | WO 2004/112179 | * 12/2004 |

OTHER PUBLICATIONS

Machine tranlsation of JP 2003-331893, Nov. 2003.*
Machine translation of JP 2004-192919, Jul. 2004.*

* cited by examiner

*Primary Examiner*—Jonathan Crepeau
(74) *Attorney, Agent, or Firm*—Fish & Richardson P.C.

(57) ABSTRACT

When an ignition switch is turned off, a hydrogen supply valve is closed. Operation of a compressor continues, and an air supply valve and an air discharge valve are opened to supply the compressed air into a fuel cell through a hydrogen supply port. The scavenging process of removing the fuel gas and the water remaining in the fuel gas channel is performed through the air discharge valve, a drain valve, and a hydrogen purge valve. Then, all the valves connected to the fuel gas channel are closed. The pressure when the valves are closed, and the pressure when a short time has elapsed after closing the valves are detected by a pressure sensor. Based on the pressure difference, a failure due to the leakage in the fuel gas channel is detected.

14 Claims, 7 Drawing Sheets

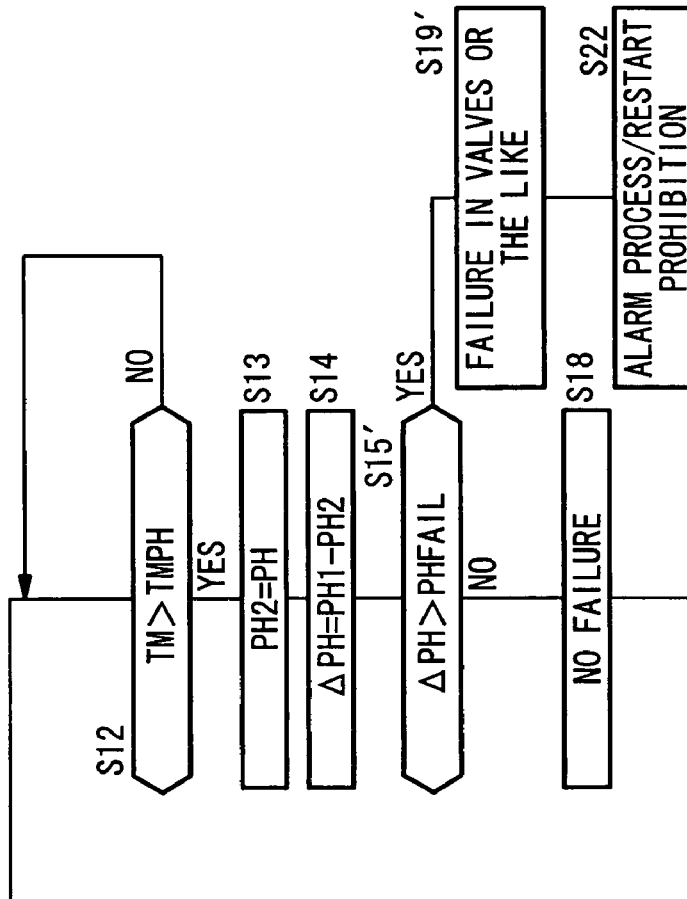
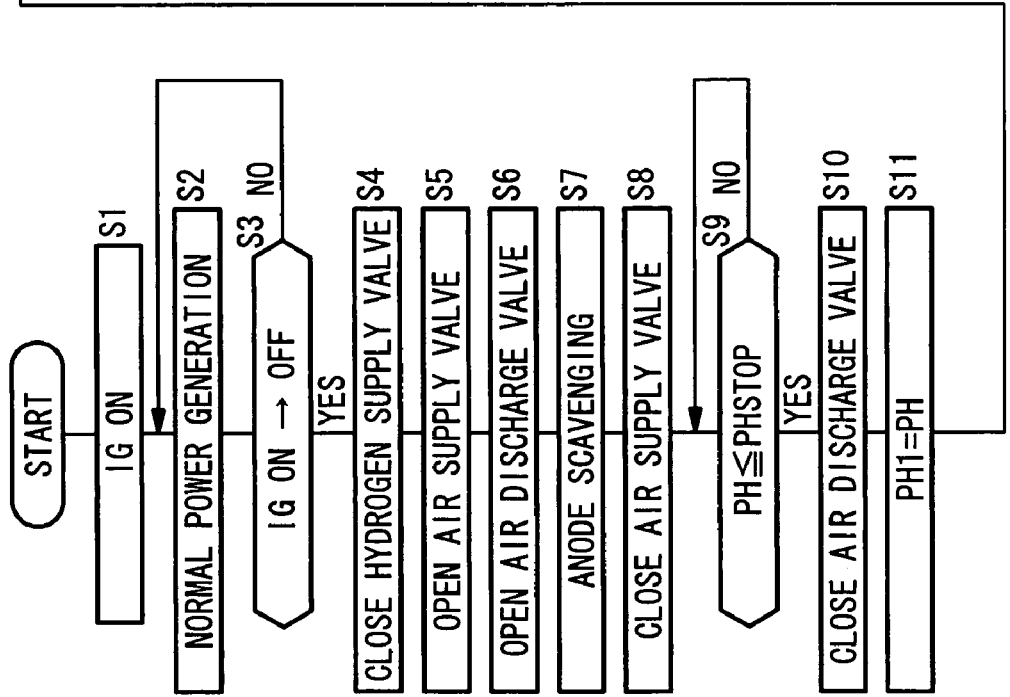
FIG. 5

FUEL CELL SYSTEM AND METHOD OF DETECTING FAILURE IN A FUEL GAS CHANNEL OF FUEL CELL SYSTEM

BACKGROUND OF THE INVENTION

1. Field of the Invention

The present invention relates to a fuel cell system to which a technique for detecting a failure due to leakage in a fuel gas channel is applied, and a method of detecting a failure in the fuel gas channel of the fuel cell system.

2. Description of the Related Art

For example, a polymer electrolyte fuel cell employs a membrane electrode assembly which includes an anode (fuel electrode) and a cathode (air electrode), and a polymer electrolyte membrane interposed between the electrodes. The electrolyte membrane is an ion exchange membrane. The membrane electrode assembly is sandwiched between a pair of separators. A fuel gas flow field is formed between the anode and one of the separators, and an oxygen-containing gas flow field is formed between the cathode and the other of the separators. In use, normally, a predetermined numbers of the membrane electrode assemblies and separators are stacked together to form a fuel cell stack.

In the fuel cell, a fuel gas such as a hydrogen-containing gas is supplied to the fuel gas flow field. The fuel gas flows through the fuel gas flow field along the anode. The catalyst of the anode induces a chemical reaction of the fuel gas to split the hydrogen molecule into hydrogen ions and electrons. The hydrogen ions move toward the cathode through the suitably humidified electrolyte membrane, and the electrons flow through an external circuit to the cathode, creating a DC electrical energy.

Further, in the fuel cell, an oxygen-containing gas such as the air is supplied to the oxygen-containing gas flow field, and the oxygen-containing gas flows along the cathode for reaction. At the cathode, hydrogen ions from the anode combine with the electrons and oxygen to produce water. The water is retained at the anode due to the back diffusion from the cathode or high humidification of the fuel gas or the like.

If the water is excessively retained at the anode, water clogging may occur undesirably. Therefore, it is necessary to eliminate the water clogging.

Therefore, in the conventional technique, if impurities such as water are retained in the fuel channel of the fuel cell system, a purge process is carried out by a purge valve provided in the fuel channel. The purge valve is opened such that the fuel gas is discharged to the outside. By increasing the flow rate of the fuel gas, the impurities are blown away, and removed from the fuel channel.

Further, in this type of the fuel cell system, in a proposed technique, when operation of the fuel cell system is finished, an interruption valve in the fuel gas channel is closed such that the fuel gas pressurized at a certain pressure value or more is contained in the fuel gas channel including the fuel gas flow field in the fuel cell to stop power generation (see Japanese Laid-Open Patent Publication No. 2004-192919).

According to the technique disclosed in Japanese Laid-Open Patent Publication No. 2004-192919, as shown in FIG. 7, the decrease in the pressure value in the fuel gas channel is monitored from the containment time of the fuel gas as the end time to determine whether the decreasing rate curve of the pressure is within the normal range or within the abnormal range. If it is determined that the decreasing rate curve of the pressure is within the normal range at the time of starting up the fuel cell system next time, the start up operation of the fuel cell system is permitted. If it is determined that the decreasing rate curve of the pressure is within the abnormal range, the start up operation of the fuel cell system is prohibited.

In the technique, it is possible to detect the failure of the interruption valve provided in the fuel gas channel.

However, in the conventional technique, as shown in FIG. 7, even in the normal condition, as the contained fuel gas flows toward the cathode through the electrolyte membrane, the pressure decreasing rate decreases gradually from 100 [%] at the operation end time as the start point of the system stop.

Therefore, the required period for determining whether the condition is normal or abnormal, i.e., the period from the operation end time is long disadvantageously. Further, the degree of the decrease in the pressure of the fuel gas may change depending on various factors such as the containment pressure, the component, the shape, and the moisture of the electrolyte membrane, and the shape of the flow field of the separator. Therefore, for each fuel cell system, in FIG. 7, the threshold curve of the pressure decreasing rate denoted by the curve drawn by the dashed line in FIG. 7 needs to be stored in a memory, and the design is complicated. Thus, in the conventional technique, the determination process is complicated.

Further, in the conventional technique, the fuel gas and the oxygen-containing gas may be mixed at each of the electrodes of the fuel cell. Therefore, the performance of the fuel cell may be degraded undesirably.

SUMMARY OF THE INVENTION

The present invention has been made taking the problems into consideration, and an object of the present invention is to provide a fuel cell system which makes it possible to detect a failure in a fuel gas channel in a short period of time after the end of operation of the fuel cell system, and to provide a method of detecting a failure in the fuel gas channel of the fuel cell system.

In carrying out the present invention, the technique of the scavenging process for the anode (hereinafter also simply referred to as the "anode scavenging technique") disclosed in Japanese Laid-Open Patent Publication No. 2003-331893 is utilized. If the water is excessively present at any of the electrodes, water clogging may occur. Therefore, the anode scavenging technique is implemented using oxygen-containing gas such as the air. When the operation of the fuel cell system is finished, the oxygen-containing gas is supplied to the anode in addition to the cathode for removing the water produced in the power generation from the membrane electrode assembly or the separators of the fuel cell. In the conventional anode scavenging technique, after the anode scavenging is finished, the fuel gas channel and the oxygen-containing gas channel communicate with the outside, and the pressure of the fuel gas channel and the pressure of the oxygen-containing gas channel become equal to the atmospheric pressure.

The fuel cell system according to the present invention includes a fuel cell, scavenging means, containment means, pressure detection means, and failure determination means. The fuel cell is operated for power generation by reaction of a fuel gas and an oxygen-containing gas. The fuel gas is supplied from a fuel supply channel to a fuel gas flow field in the fuel cell. The oxygen-containing gas is supplied from an oxygen-containing gas supply channel to an oxygen-containing gas flow field in the fuel cell. The fuel gas consumed in the power generation is discharged to a fuel discharge channel and the oxygen-containing gas consumed in the power generation is discharged to an oxygen-containing gas discharge channel. The scavenging means scavenges the fuel gas from a fuel gas channel including the fuel supply channel, the fuel gas flow field in the fuel cell, and the fuel discharge channel by supplying the oxygen-containing gas into the fuel gas flow field in the fuel cell such that the fuel gas is replaced by the oxygen-containing gas, and discharging the supplied oxygen-containing gas through the fuel discharge channel. The containment means contains the oxygen-containing gas in the fuel gas channel after scavenging by the scavenging means. The pressure detection means is provided in the fuel gas channel, and the failure determination means determines a failure when the pressure of the oxygen-containing gas detected by the pressure detection means has a predetermined value or less.

According to the present invention, when the operation of the fuel cell system is finished, the oxygen-containing gas which does not pass through the electrolyte membrane toward the cathode is contained in the fuel gas channel. The pressure decrease after the containment is detected to determine a failure in the fuel gas channel in a short period of time. Further, according to the present invention, after the oxygen-containing gas is contained in the fuel gas channel, only the oxygen-containing gas is present at the anode and the cathode. Therefore, unlike the case of the conventional technique, when power generation is stopped, it is possible to avoid the degradation of the performance due to the mixture of the oxygen-containing gas and the fuel gas.

In the structure, when a fuel gas circulation channel for circulating the consumed fuel gas from the fuel discharge channel back to the fuel supply channel is provided, and a plurality of valves are provided in the fuel gas channel including the fuel gas circulation channel, the failure detection means can identify a valve having a failure, among the valves (e.g., having different diameters), depending on how the pressure of the contained oxygen-containing gas is decreased.

In each of the inventions as described above, the pressure detection means and the failure determination means may not be used. Also in the case in which the pressure detection means and the failure determination means are not used, in particular, in the polymer electrolyte fuel cell, when the power generation is stopped (when the system is stopped), after the oxygen-containing gas which does not pass through the electrolyte membrane toward the cathode is contained in the fuel gas channel at a predetermined pressure, only the oxygen-containing gas is present at the anode and the cathode. Therefore, after the power generation is stopped (after the system is stopped), unlike the case of the conventional technique, it is possible to avoid the degradation of the performance due to the mixture of the oxygen-containing gas and the fuel gas.

In a method of detecting a failure in a fuel gas channel of the fuel cell system according to the present invention, a fuel cell is operated for power generation by reaction of a fuel gas and an oxygen-containing gas. The fuel gas is supplied from a fuel supply channel to a fuel gas flow field in the fuel cell. The oxygen-containing gas is supplied from an oxygen-containing gas supply channel to an oxygen-containing gas flow field in the fuel cell, the fuel gas consumed in the power generation is discharged to a fuel discharge channel and the oxygen-containing gas consumed in the power generation is discharged to an oxygen-containing gas discharge channel. The fuel gas channel includes the fuel supply channel, the fuel gas flow field in the fuel cell, and the fuel discharge channel. The method comprises the steps of scavenging the fuel gas from a fuel gas channel by supplying the oxygen-containing gas into the fuel gas flow field in the fuel cell such that the fuel gas is replaced by the oxygen-containing gas, and discharging the supplied oxygen-containing gas through the fuel discharge channel after scavenging, containing the oxygen-containing gas in the fuel gas channel by closing valves provided in the fuel gas channel, detecting the pressure of the oxygen-containing gas contained in the fuel gas channel, and determining a failure when the detected pressure of the contained oxygen-containing gas becomes the pressure having a predetermined value or less.

According to the present invention, when the operation of the fuel cell system is finished, the oxygen-containing gas which does not pass through the electrolyte membrane toward the cathode is contained in the fuel gas channel at a predetermined pressure. The pressure decrease after the containment is detected to determine a failure due to leakage in the fuel gas channel in a short period of time.

In the containment step, by providing the pressure adjustment step of adjusting the pressure of the oxygen-containing gas contained in the fuel gas channel to the predetermined value, it is possible to detect a failure based on the degree of the pressure decrease.

Specifically, in the failure determination step, it is possible to identify, and determine the failure position depending on how the pressure of the contained oxygen-containing gas is decreased.

In each of the inventions, when a failure is detected, restart of the fuel cell system is prohibited, or an alarm is issued for making it possible to prevent the degradation of the performance of the fuel cell, and suppress the leakage of the fuel gas to the outside as much as possible.

The invention is suitably applicable to a polymer electrolyte fuel cell.

According to the present invention, after the operation of the fuel cell system is finished, the oxygen-containing gas having the pressure higher than the atmospheric pressure is used for the scavenging process for the anode. The fuel gas in the fuel gas channel is replaced by the oxygen-containing gas. While the high pressure oxygen-containing gas flows through the fuel gas channel, the fuel gas channel is closed. Therefore, the high pressure oxygen-containing gas is contained in the fuel gas channel.

Since the oxygen-containing gas does not pass through the electrolyte membrane, if the oxygen-containing gas is hermetically contained in the fuel gas channel by the valves, no pressure decrease occurs. Therefore, by detecting the pressure in the fuel gas channel, it is possible to immediately determine whether there is any failure due to the leakage in the fuel gas channel.

Further, in the present invention, after the power generation is stopped and the oxygen-containing gas is contained in the fuel gas channel, only the oxygen-containing gas is present at the anode and the cathode. Thus, unlike the case of the conventional technique, it is possible to avoid the degradation of the performance due to the mixture of the oxygen-containing gas and the fuel gas.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 5 is a flow chart illustrating operation in the process of detecting a failure in a fuel gas channel after the scavenging process for an anode according to the second embodiment of the present invention;

DESCRIPTION OF THE PREFERRED EMBODIMENTS

Hereinafter, embodiments of the present invention will be described with reference to the drawings.

Figure 1:
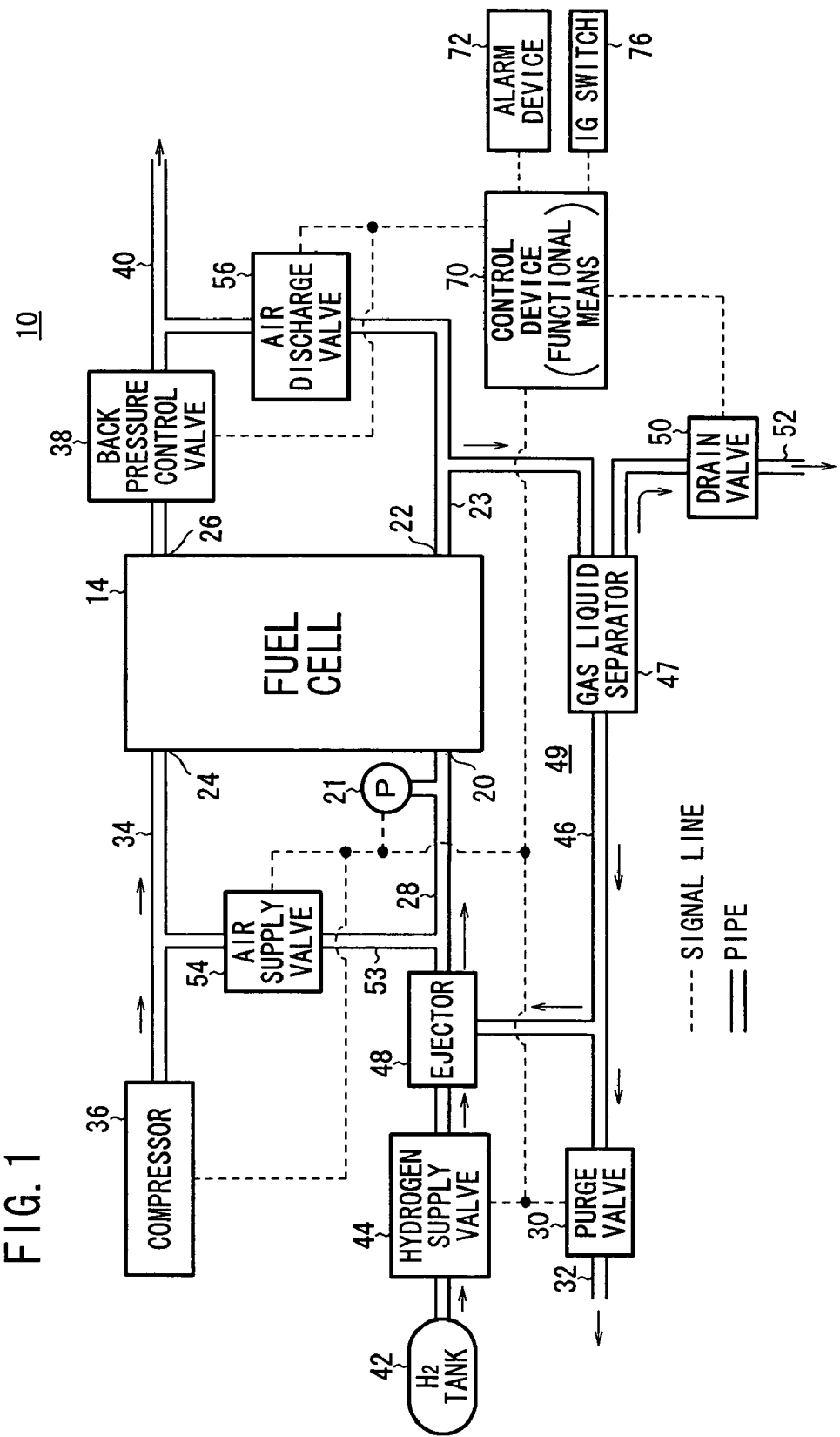
FIG. 1 is a diagram schematically showing structure of a fuel cell system according to a first embodiment of the present invention.

FIG. 1 is a diagram schematically showing structure of a fuel cell system 10 according to a first embodiment of the present invention.

Basically, the fuel cell system 10 includes a fuel cell 14, a hydrogen tank 42 for supplying a hydrogen gas ($H_2$) as a fuel gas to the fuel cell 14, and a compressor (air compressor) 36 for supplying a compressed air including, e.g., oxygen ($O_2$) to the fuel cell 14.

The fuel cell 14 includes a membrane electrode assembly and a pair of separators sandwiching the membrane electrode assembly. The membrane electrode assembly includes an anode, a cathode, and a solid polymer electrolyte membrane interposed between the anode and the cathode. A fuel gas flow field is formed between the anode and one of the separators, and an oxygen-containing gas flow field is formed between the cathode and the other of the separators. A plurality of unit cells are stacked together to form the stack structure of the fuel cell 14.

The fuel cell 14 has a hydrogen supply port 20 for supplying the hydrogen gas to the fuel gas flow field in the fuel cell 14, a hydrogen discharge port 22 for discharging an exhaust gas from the fuel gas flow field (the exhaust gas contains the hydrogen gas which has not been consumed in the power generation), an air supply port 24 for supplying the compressed air to the oxygen-containing gas flow field in the fuel cell 14, and an air discharge port 26 for discharging the oxygen-containing gas from the oxygen-containing gas flow field.

A hydrogen supply channel 28 is connected to the hydrogen supply port 20. A pressure sensor 21 as pressure detection means is provided in the hydrogen supply channel 28. Further, an ejector 48 is provided in the hydrogen supply channel 28. The hydrogen tank 42 stores a high pressure hydrogen, and the hydrogen gas is supplied from the hydrogen tank 42 to the ejector 48 through a hydrogen supply valve 44 which also functions as a hydrogen interruption valve. The ejector 48 supplies the hydrogen gas to the fuel gas flow field in the fuel cell 14 through the hydrogen supply channel 28 and the hydrogen supply port 20. Further, the ejector 48 sucks the exhaust gas containing the unconsumed hydrogen gas which has not been consumed in the fuel cell 14 such that the exhaust gas is discharged to a hydrogen circulation channel 46 connected to a hydrogen discharge channel 23 extending from the hydrogen discharge port 22. The exhaust gas sucked by the ejector 48 is supplied again to the fuel cell 14.

In the structure, a gas liquid separator 47 for separating the water and the gas is provided between the hydrogen discharge channel 23 and the hydrogen circulation channel 46. The water stored in the gas liquid separator 47 is discharged to the outside through a drain valve 50 and a water discharge channel 52.

A hydrogen purge valve 30 is provided in the hydrogen circulation channel 46. The hydrogen purge valve 30 is opened as necessary during normal power generation. When the hydrogen purge valve 30 is opened, the fuel gas containing the nitrogen gas mixed into the anode from the cathode through the electrolyte membrane is discharged to the outside through a hydrogen purge channel 32 and a dilution box (not shown). Thus, the power generation stability is achieved.

Further, an air discharge valve 56 is provided in the hydrogen discharge channel 23. When the air discharge valve 56 is opened, the water retained at the anode or the separators, or the residual fuel gas is discharged together with the compressed air which has been supplied from the hydrogen supply port 20 at the time of the scavenging process for the anode (hereinafter referred to as the "anode scavenging process"), from the hydrogen discharge port 22 to the outside through an air discharge channel 40.

The air discharge valve 56 and an air supply valve 54 as described later are ON/OFF valves for regulating the relatively large flow rate. The purge valve 30 is an ON/OFF valve for regulating the relatively medium flow rate. The drain valve 50 is an ON/OFF valve for regulating the relatively small flow rate.

An air supply channel 34 is connected to the air supply port 24. A compressor (air compressor) 36 is connected to the air supply channel 34. The compressor 36 includes a compressor motor for compressing the atmospheric air from the outside, and supplying the compressed air to the fuel cell 14.

Further, a back pressure control valve 38 is provided at the air discharge port 26. The back pressure control valve 38 regulates the pressure of the air supplied to the oxygen-containing gas flow field in the fuel cell 14 through the air supply channel 34 and the air supply port 24. The air discharge port 26 of the fuel cell 14 is connected to the outside through the back pressure control valve 38 and an air discharge channel 40.

Further, the air supply valve 54 is provided between the hydrogen supply channel 28 and the air supply channel 34 connected to the fuel cell 14. The air supply valve 54 is opened at the time of supplying the compressed air into the hydrogen supply port 20 through an air inlet channel 53, i.e., at the time of the anode scavenging process.

Further, in the fuel cell system 10, a control device 70 is provided. The control device 70 controls the entire operation of the fuel cell system 10. An alarm device 72 is connected to the control device 70. When a failure occurs, the alarm device 72 issues an alarm by outputting sounds or displaying images on the screen. The alarm device 72 may use the sounds and the display screen of a navigation device.

The control device 70 comprises a computer including a CPU, a memory, and a timer. The control device 70 operates as means for achieving various functions by executing programs stored in the memory based on various inputs. In the embodiment, the control device 70 is operated as scavenging means, in cooperation with the compressor 36, the air supply valve 54, and the air discharge valve 56. Further, the control device 70 is operated as containment means which closes the various valves 54, 56, 30, 50 after the anode scavenging process by the scavenging means such that the oxygen-containing gas is contained in a predetermined area of the fuel cell system 10. Further, the control device 70 is operated as failure determination means for determining a failure in a fuel gas channel 49 by comparing a pressure value PH of the contained oxygen-containing gas detected by the pressure sensor 21 with a predetermined value. Additionally, for example, the control device 70 is operated as counter means such as a timer for counting a predetermined time. In FIG. 1, dotted lines denote signal lines such as a control line, and double lines denote pipes.

During normal power generation operation of the fuel cell system 10, by the valve control of the control device 70, basically, the hydrogen supply valve 44 is opened, and the back pressure control valve 38 is opened by the suitable degree. Though the hydrogen purge valve 30 and the drain valve 50 are opened as necessary, normally, the hydrogen purge valve 30 and the drain valve 50 are closed. Further, the air supply valve 54 and the air discharge valve 56 which are operated in the anode scavenging process are closed.

During the normal power generation operation, the air (oxygen) is supplied from the compressor 36 to the cathode of the fuel cell 14, and the hydrogen gas is supplied from the high pressure hydrogen tank 42 to the anode. At the anode, the hydrogen is split into hydrogen ions and electrons. The hydrogen ions move toward the cathode through the solid polymer electrolyte membrane. The electrons are collected as an electrical energy by an external circuit (not shown), and the electrical energy is supplied to a load (in the case of a fuel cell vehicle where the fuel cell system 10 is mounted in the vehicle, the load is a driving motor, for example). The generated electrical energy is partially used for controlling the various valves or driving the compressor 36 or the like, e.g., at the time of starting up, or stopping the fuel cell system 10. That is, the electrical energy is utilized for charging the electrical charging device such as a capacitor or a battery for supplying electricity to the compressor 36 or the like, at the time of starting up the fuel cell system 10, performing operation of the fuel cell system such as the anode scavenging process, and interrupting/stopping operation of the fuel cell system 10.

Further, an ignition switch (IG switch) 76 is connected to the control device 70. The ignition switch 76 outputs a start-up signal and a stop signal for the fuel cell system 10.

Figure 2:
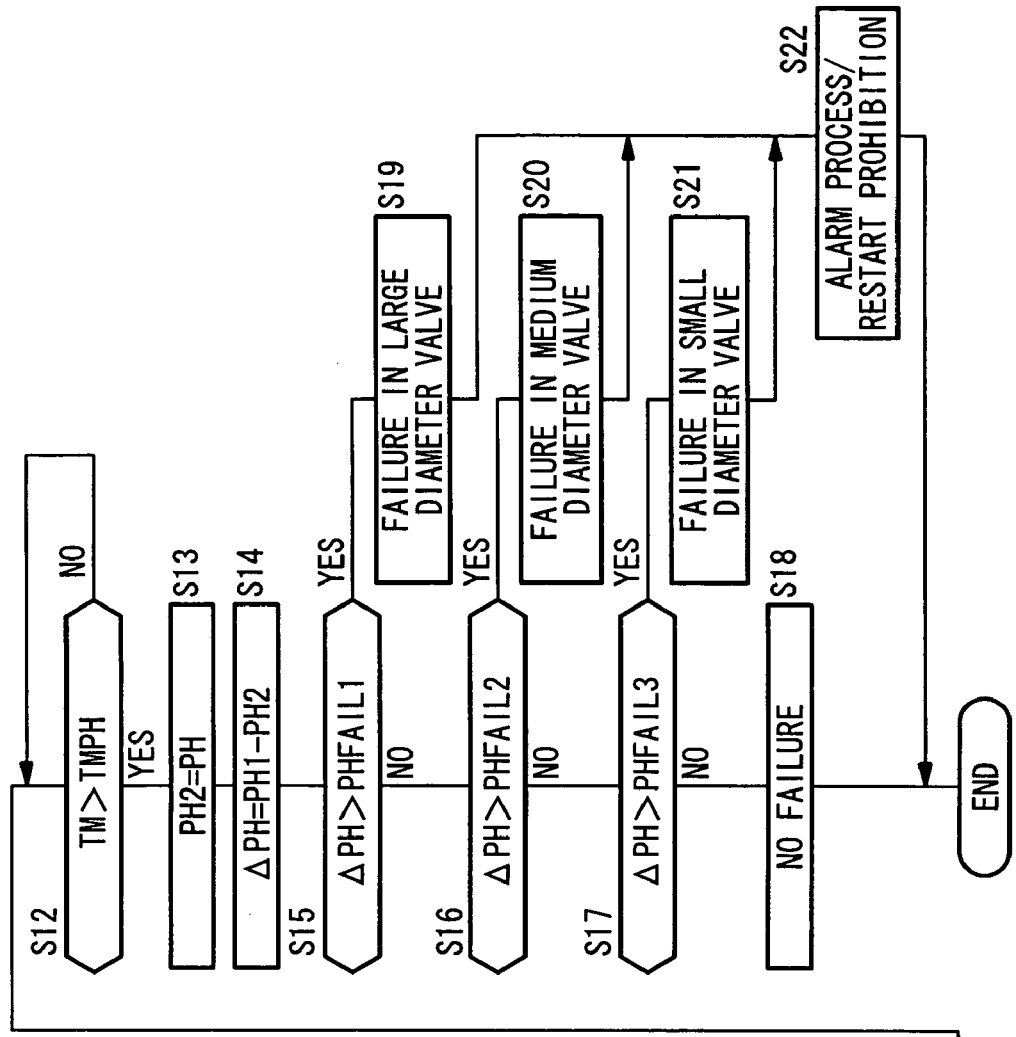
FIG. 2 is a flowchart illustrating operation in the process of detecting a failure in a fuel gas channel after the scavenging process for an anode.

The basic structure and operation of the fuel cell system 10 have been described above. Next, operation of detecting the gas leakage in the fuel gas channel 49 including the hydrogen supply channel (fuel supply channel) 28, the fuel gas flow field (not shown) in the fuel cell 14, the hydrogen discharge channel (fuel discharge channel) 23, and the hydrogen circulation channel 46 as a failure will be described below with reference to a flow chart in FIG. 2 and a time chart (map) in FIG. 3.

In step S1, when the control device 70 detects an ON signal (a signal indicating the transition from the OFF state to the ON state) of the ignition switch 76 as the start-up signal for the fuel cell system 10, in step S2, the above described normal power generation operation of the fuel cell 14 is carried out.

Then, in step S3, it is determined whether the ignition switch 76 is switched from the ON state to the OFF state.

In step S3, if it is determined that the ignition switch 76 is still in the ON state, the power generation operation in step S2 continues. In step S3, if it is determined that the ignition switch 76 is switched to the OFF sate, the system stop process is started. In the system stop process, firstly, in step S4, operation of the compressor 36 is switched from the state driven by the fuel cell 14 to the state driven by the unillustrated electrical charging device such as the capacitor or the battery. Further, the hydrogen supply valve 44 is closed to stop the supply of the hydrogen as the fuel gas to the fuel cell 14. Thereafter, the anode scavenging process as shown in steps S5 to S8 is carried out.

In the anode scavenging process, at the time t0 immediately after the hydrogen supply valve 44 is closed (see FIG. 3), firstly, the air supply valve 54 is opened, and the hydrogen purge valve 30 and the drain valve 50 are opened for a predetermined time. The compressed air from the compressor 36 flows from the air supply valve 54 to the fuel gas flow field in the fuel cell 14 through the hydrogen supply channel 28 and the hydrogen supply port 20. Further, the compressed air discharged from the fuel cell 14 from the hydrogen discharge port 22 flows through the hydrogen discharge channel 23 into the gas liquid separator 47, and flows through the hydrogen circulation channel 46, the hydrogen purge valve 30, and the hydrogen purge channel 32. Then, the compressed air is discharged to the outside through the dilution box (not shown).

Then, in step S6, the air discharge valve 56 is also opened. Then, in step S7, the compressed air is supplied from the compressor 36 through the air supply valve 54 for a predetermined time. The compressed air flows through the hydrogen supply channel 28, the fuel gas flow field in the fuel cell 14, the hydrogen discharge port 22, the hydrogen discharge channel 23, the air discharge valve 56, and the air discharge channel 40 for scavenging. Further, the compressed air flows through the hydrogen discharge port 22, the hydrogen discharge channel 23, the gas liquid separator 47, the hydrogen circulation channel 46, and the hydrogen purge valve 30. Thus, scavenging of the fuel gas channel 49 including the hydrogen supply channel 28, the fuel gas flow field in the fuel cell 14, the hydrogen discharge channel 23, and the hydrogen circulation channel 46 is performed. Further, at the same time, scavenging of the oxygen-containing gas channel is performed through the air supply channel 34, the air supply port 24, the oxygen-containing gas flow field in the fuel cell 14, the air discharge port 26, and the open back pressure control valve 38, and the air discharge channel 40.

After the anode scavenging process, in step S8, the air supply valve 54, the hydrogen purge valve 30, and the drain valve 50 are closed, and operation of the compressor 36 is stopped (see time t1).

Figure 3:
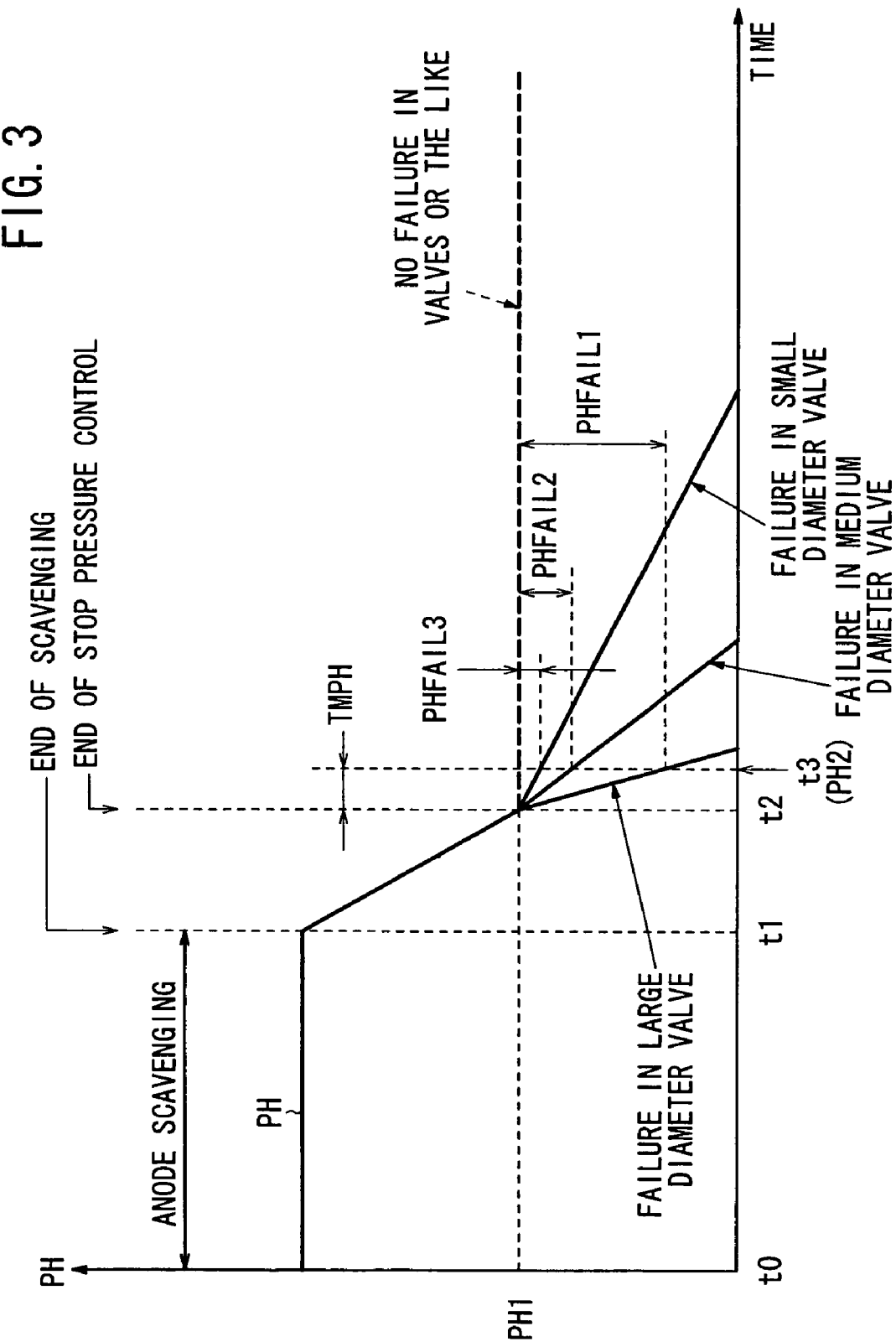
FIG. 3 is a time chart (map) illustrating operation in the process of detecting a failure in the fuel gas channel after the scavenging process for the anode.

Then, in step S9, the pressure sensor 21 successively detects the pressure of the compressed air in the fuel gas channel 49 including the hydrogen supply channel 28, the fuel gas flow field in the fuel cell 14, the hydrogen discharge channel 23, and the hydrogen circulation channel 46. The value PH of the pressure of the compressed air in the fuel gas channel 49 is monitored until it reaches the stop target pressure value PHSTOP. After the time t1, as shown in FIG. 3, since the compressed air is discharged gradually through the air discharge valve 56 and the air discharge channel 40, the pressure of the fuel gas channel 49 is decreased gradually.

Thus, when the pressure value PH reaches the stop target pressure value PHSTOP, in step S10, the air discharge valve 56 is closed, and the compressed air as the oxygen-containing gas is contained in the fuel gas channel 49 (time t2). That is, at the time t2, all the valves connected to the fuel gas channel 49 including the fuel gas flow field in the fuel cell 14, i.e., the air supply valve 54, the air discharge valve 56, the hydrogen supply valve 44, the purge valve 30, and the drain valve 50 are closed. Thus, the compressed air at a predetermined pressure is contained in the fuel gas channel 49, and the stop process of the system is finished.

Then, in step S11 at the time t2, the pressure value PH at the time of the containment is stored in a memory as a predetermined pressure value PH1 (PH=PH1≈PHSTOP). The predetermined pressure value PH1 is the atmospheric pressure or more.

Next, in step S12, a predetermined time TMPH is lapsed. In comparison with the determination time (lapsed time) in the conventional technique (Japanese Laid-Open Patent Publication No. 2004-192919), the counted time TM counted by the timer from the end time t2 when the stop process of the system is finished to the determination time (confirmation time) t3 is considerably short.

In step S13, the pressure value PH at the time t3 when the determination in step S12 is made (TM>TMPH) is stored in the memory as a measurement pressure value PH2.

Then, the failure determination process is carried out from step S14. Firstly, in step S14, the pressure drop value ΔPH from the pressure value PH1 is calculated by the expression ΔPH=PH1−PH2 (PH1: the predetermined pressure value at the containment time t1, PH2: the measurement pressure value at the confirmation time t3).

Then, in step S15, it is determined whether the pressure drop value ΔPH at the time t3 is greater than the pressure drop value PHFAIL1 (ΔPH>PHFAIL1) over the predetermined time TMPH when a failure occurs in the air discharge valve 56 (and the air supply valve 54) having the large size diameter for the anode scavenging process. In step S16, it is determined whether the pressure drop value ΔPH at the time t3 is greater than the pressure drop value PHFAIL2 (ΔPH>PHFAIL2) over the predetermined time TMPH when a failure occurs in the hydrogen purge valve 30 having the medium size diameter. In step S17, it is determined whether the pressure drop value ΔPH at the time t3 is greater than the pressure drop value PHFAIL3 (ΔPH>PHFAIL3) due to the minute leakage over the predetermined time TMPH when a failure occurs in the drain valve 50 having the small diameter or the valve seat.

If the determinations in steps S15 to S17 are all negative, since the pressure drop valve ΔPH is 0 or nearly 0, in step S18, it is determined that no leakage is occurring in the fuel gas channel 49 and no failure occurs in components such as the air discharge valve 56 (and the air supply valve 54) having the large diameter for the anode scavenging process, the hydrogen purge valve 30 having the medium size diameter, and the drain valve 50 having the small diameter or the valve seat, i.e., it is determined that the operation is in the normal state without any failures in the valves or the like. Thus, the stop pressure control process after the anode scavenging process is finished.

If any of the determinations in steps S15 to S17 is positive, it is determined that leakage is occurring in the fuel gas channel 49. In step S19, it is determined that a failure is occurring in the air discharge valve 56 (and the air supply valve 54) having the large diameter for the anode scavenging process. In step S20, it is determined that a failure is occurring in the hydrogen purge valve 30 having the medium size diameter. In step S21, it is determined that a failure is occurring in the drain valve 50 having the smaller diameter (in this case, a failure due to the minute leakage such as defection of the valve seat in each valve can be detected). In step S22, an alarm indicating the failure is issued by displaying the alarm on the alarm device 72, or by outputting buzzer sounds or message sounds.

If it is determined that there is a failure, the fuel cell system 10 is controlled such that the fuel cell system 10 does not start up even if the ignition switch 76 is turned on again. Further, it is preferable that when the ignition switch 76 is turned on again, an alarm indicating the ON state of the ignition switch 76 is issued by displaying the alarm on the alarm device 72, or outputting the buzzer sounds, or message sounds.

Figure 6:
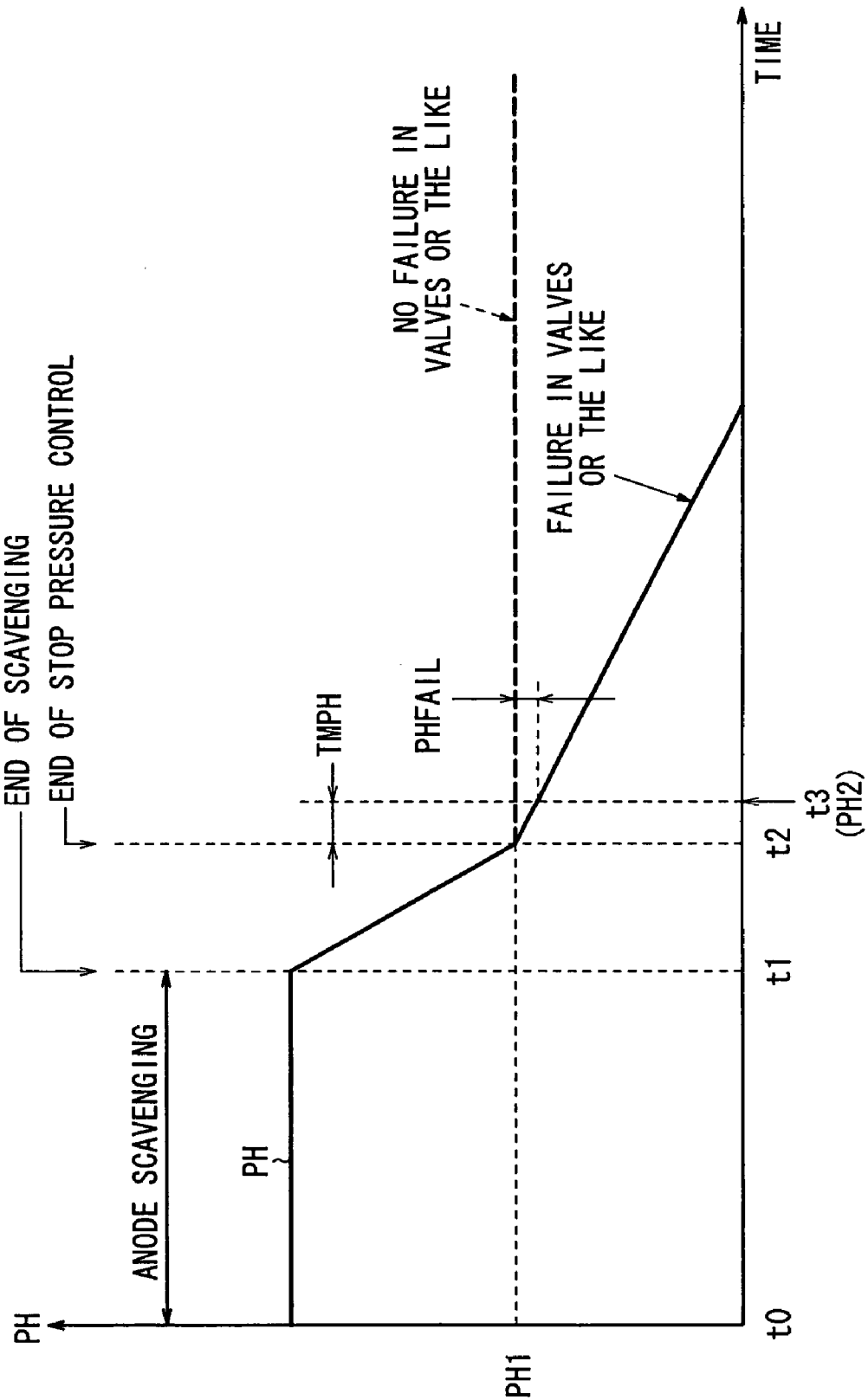
FIG. 6 is a time chart illustrating operation in the process of detecting a failure in the fuel gas channel after the scavenging process for the anode according to the second embodiment of the present invention.
Figure 7:
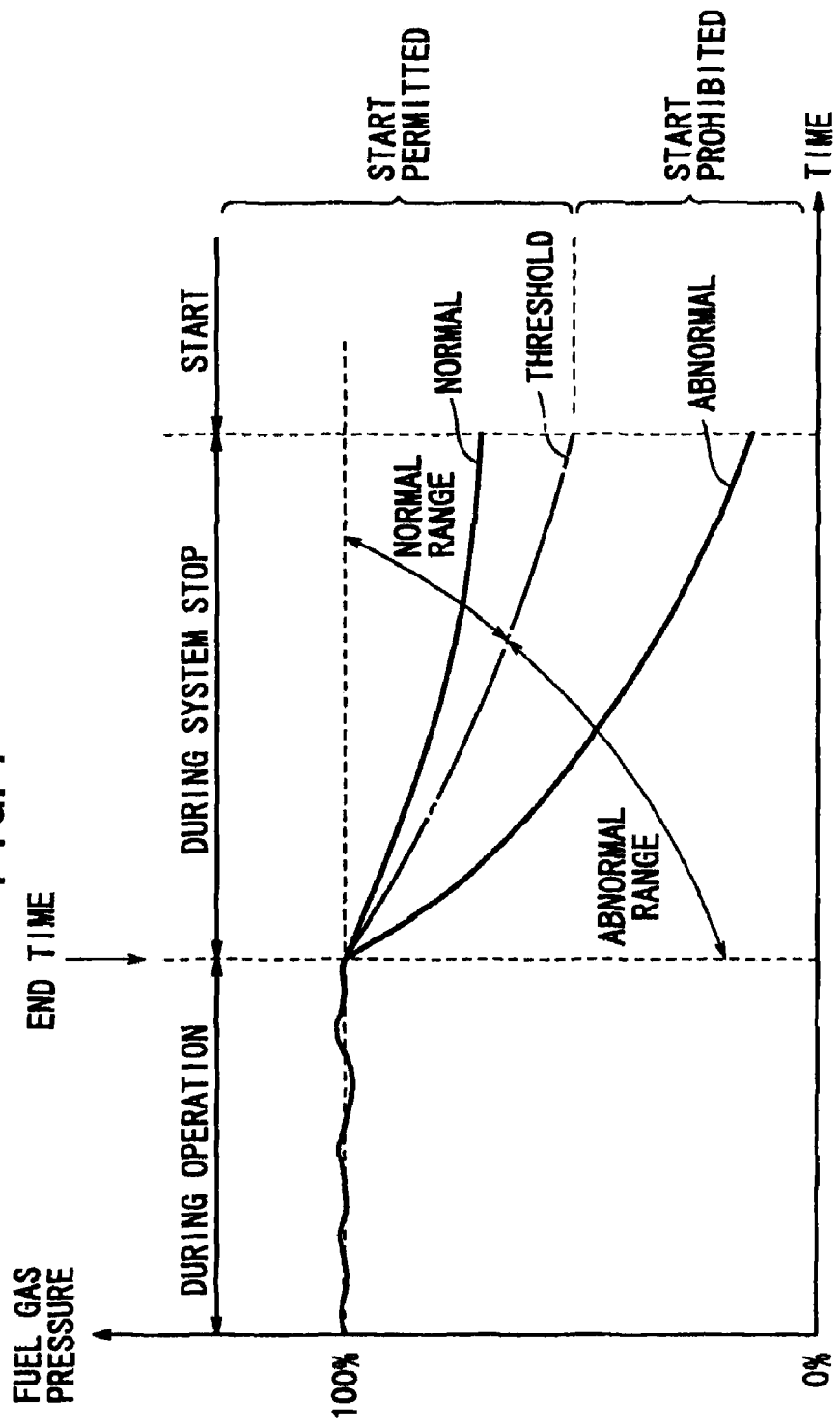
FIG. 7 is a time chart showing operation in the process of detecting a failure in a fuel gas channel in a conventional technique.

In the above-described embodiment, the failures of all the valves 30, 50, 54, and 56 connected to the fuel gas channel 49 can be detected separately. Alternatively, the structure may be changed in a second embodiment as shown in FIGS. 5 and 6. In the embodiment, a map in FIG. 6 for detecting the minute leakage in the drain valve 50 having the smallest diameter, the valve seat or the like is used, and the failure in any of the valves 30, 50, 54, and 56 can be detected at once in the determination of step S15' and step S19' in FIG. 5. In FIG. 5, the steps other than steps S15' and S19' are carried out in the same manner as the steps shown in FIG. 2.

Figure 4:
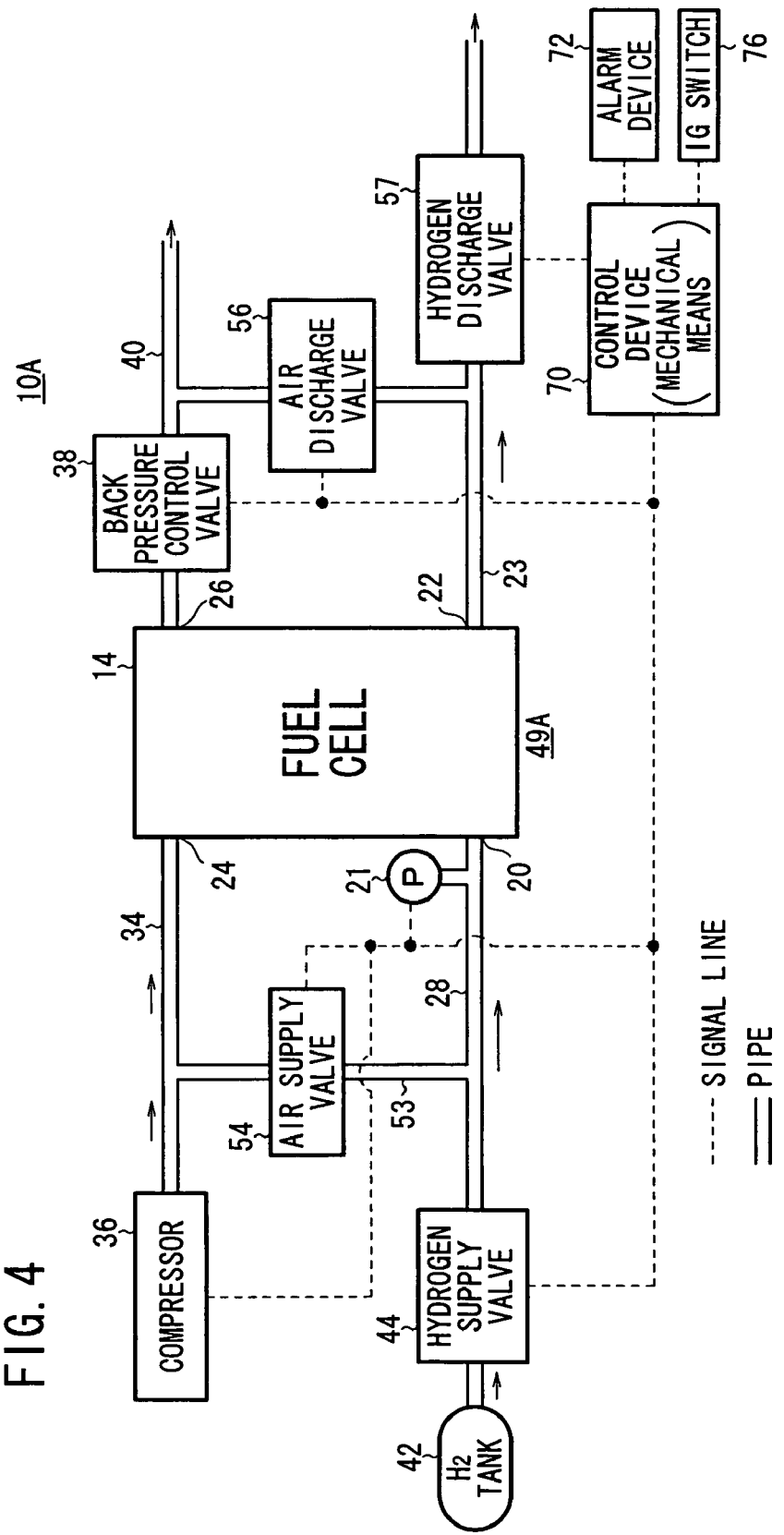
FIG. 4 is a diagram schematically showing a fuel cell system according to a second embodiment of the present invention.

The flow chart and the map in FIGS. 5 and 6 are applicable to the structure of a fuel cell system 10A shown in FIG. 4. In the fuel cell system 10A, the hydrogen purge valve 30, the ejector 48, the gas liquid separator 47, and the drain valve 50 are removed from the fuel gas channel 49 of the fuel cell system 10 according to the embodiment of FIG. 1, and a hydrogen discharge valve 57 is provided, and the air discharge valve 56 and the air supply valve 54 are present. In the fuel cell system 10A in the example of FIG. 4, it is possible to detect a failure in a fuel gas channel 49A including the hydrogen supply valve 44, the air discharge valve 56, the air supply valve 54, the hydrogen discharge valve 57, and the fuel gas flow field in the fuel cell 14. During normal power generation, the hydrogen discharge valve 57 is suitably opened and closed by the control device 70, and closed immediately before the anode scavenging process in step S7.

As described above, in the embodiments in FIGS. 1 and 4, during normal power generation of the fuel cell 14, when the ignition switch 76 is turned off to stop the fuel cell system 10 or the fuel cell system 10A, the hydrogen supply valve 44 is closed. Operation of the compressor 36 continues, and the air supply valve 54 and the air discharge valve 56 are opened such that the compressed air flows from the hydrogen supply port 20 into the fuel cell 14. The anode scavenging process for removing the fuel gas, water, or the like remaining in the fuel gas channel 49 is carried out through the air discharge valve 56, the drain valve 50, and the hydrogen purge valve 30. Then, operation of the compressor 36 is stopped. At the time t1, the drain valve 50, the hydrogen purge valve 30, and the air supply valve 54 are closed.

Thereafter, at the time t2 when the pressure valve PH of the fuel gas channel 49 becomes the predetermined pressure value PHSTOP or less, the air discharge valve 56 as the last valve connected to the fuel gas channel 49 or the fuel gas channel 49A is closed. The containment predetermined pressure valve PHI (≈PHSTOP) of the oxygen-containing gas contained in the fuel gas channel 49 or the fuel gas channel 49A at the time t2 and the pressure value PH2 at the time t3, i.e., a short time after the containment time t2 are measured. By calculating the pressure difference ΔPH (ΔPH=PH1−PH2), based on the pressure difference ΔPH, it is possible to detect the abnormal state (failure state) due to the leakage in the fuel gas channel 49 or the normal state. At this time, depending on the degree of the leakage, it is possible to identify, and detect the valve having the failure.

As described above, in the embodiments, unlike the technique disclosed in Japanese Laid-Open Patent Publication No. 2004-192919, the hydrogen as the fuel gas is not contained in the fuel gas channel 49 or the fuel gas channel 49A. Instead, the air as the oxygen-containing gas is contained in the fuel gas channel 49 or the fuel gas channel 49A. Thus, it is possible to easily detect the failure in a short period of time without any influence of the so-called membrane penetration.

Further, after the air is contained in the fuel gas channel 49 or the fuel gas channel 49A, only the air is present at the anode and the cathode. Therefore, unlike the technique disclosed in the publication, when the power generation is stopped, it is possible to prevent degradation of the performance of the fuel cell 14 by the mixture of the oxygen-containing gas and the fuel gas.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell system comprising:
   a fuel cell operated for power generation by reaction of a fuel gas and an oxygen-containing gas, the fuel gas being supplied from a fuel supply channel to a fuel gas flow field in said fuel cell, the oxygen-containing gas being supplied from an oxygen-containing gas supply channel to an oxygen-containing gas flow field in said fuel cell, the fuel gas consumed in the power generation being discharged to a fuel discharge channel and the oxygen-containing gas consumed in the power generation being discharged to an oxygen-containing gas discharge channel;
   scavenging means for scavenging the fuel gas from a fuel gas channel including said fuel supply channel, said fuel gas flow field in said fuel cell, and said fuel discharge channel by supplying the oxygen-containing gas into said fuel gas flow field in said fuel cell such that the fuel gas is replaced by the oxygen-containing gas, and discharging the supplied oxygen-containing gas through said fuel discharge channel;
   containment means for containing the oxygen-containing gas in said fuel gas channel after scavenging by said scavenging means;
   pressure detection means provided in said fuel gas channel; and
   failure determination means for determining a failure when the pressure of the oxygen-containing gas detected by said pressure detection means has a predetermined value or less.

2. A fuel cell system according to claim 1, wherein said fuel cell is a polymer electrolyte fuel cell.

3. A fuel cell system according to claim 1, wherein an alarm is issued when said failure determination means determines a failure.

4. A fuel cell system according to claim 1, wherein a fuel circulation channel is provided for circulating the fuel gas from said fuel discharge channel back to said fuel supply channel, and a plurality of valves are provided in said fuel gas channel including said fuel circulation channel; and
   said failure detection means identifies a valve having a failure, among said plurality of valves, depending on how the pressure of the contained oxygen-containing gas is decreased.

5. A fuel cell system according to claim 4, wherein said fuel cell is a polymer electrolyte fuel cell.

6. A failure detection method for detecting a failure in a fuel gas channel for a fuel cell operated for power generation by reaction of a fuel gas and an oxygen-containing gas, the fuel gas being supplied from a fuel supply channel to a fuel gas flow field in said fuel cell, the oxygen-containing gas being supplied from an oxygen-containing gas supply channel to an oxygen-containing gas flow field in said fuel cell, the fuel gas consumed in the power generation being discharged to a fuel discharge channel and the oxygen-containing gas consumed in the power generation being discharged to an oxygen-containing gas discharge channel, said fuel gas channel including said fuel supply channel, said fuel gas flow field in said fuel cell, and said fuel discharge channel, said method comprising the steps of:
   scavenging the fuel gas from said fuel gas channel by supplying the oxygen-containing gas into said fuel gas flow field in said fuel cell such that the fuel gas is replaced by the oxygen-containing gas, and discharging the supplied oxygen-containing gas through said fuel discharge channel;
   containing the oxygen-containing gas in said fuel gas channel by closing valves provided in said fuel gas channel;
   detecting the pressure of the oxygen-containing gas contained in said fuel gas channel; and
   determining a failure when the detected pressure of the contained oxygen-containing gas becomes the pressure having a predetermined value or less.

7. A failure detection method according to claim 6, wherein said fuel cell is a polymer electrolyte fuel cell.

8. A failure detection method according to claim 6, further comprising the step of issuing an alarm when a failure is determined in said failure determination step.

9. A failure detection method according to claim 6, wherein said containment step comprises the step of adjusting the pressure of the oxygen-containing gas contained in said fuel gas channel to a predetermined value.

10. A failure detection method according to claim 9, wherein said fuel cell is a polymer electrolyte fuel cell.

11. A failure detection method according to claim 9, wherein in said failure determination step, a failure position is determined depending on how the pressure of the contained oxygen-containing gas is decreased.

12. A failure detection method according to claim 11, wherein said fuel cell is a polymer electrolyte fuel cell.

13. A fuel cell system according to claim 1 wherein the scavenging means is arranged to scavenge the fuel gas from the fuel gas channel by opening an air supply valve for supplying the oxygen-containing gas into the fuel gas flow field in the fuel cell such that the fuel gas is replaced by the oxygen-containing gas, and
   wherein the containment means is arranged to contain the oxygen-containing gas in the fuel gas channel by closing the air supply valve after scavenging by the scavenging means.

14. A failure detection method according to claim 6 wherein scavenging the fuel gas from the fuel gas channel includes opening an air supply valve for supplying the oxygen-containing gas into the fuel gas flow field in the fuel cell such that the fuel gas is replaced by the oxygen-containing gas, and
   wherein containing the oxygen-containing gas in the fuel gas channel includes closing the air supply valve after scavenging.

* * * * *